(12) United States Patent
Kikuchi

(10) Patent No.: US 10,696,102 B2
(45) Date of Patent: Jun. 30, 2020

(54) TIRE

(71) Applicant: Sumitomo Rubber Industries, Ltd., Kobe-shi, Hyogo (JP)

(72) Inventor: Hiroshi Kikuchi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 457 days.

(21) Appl. No.: 15/274,371

(22) Filed: Sep. 23, 2016

(65) Prior Publication Data
US 2017/0100965 A1 Apr. 13, 2017

(30) Foreign Application Priority Data

Oct. 9, 2015 (JP) .................................. 2015-201371

(51) Int. Cl.
*B60C 11/12* (2006.01)
*B60C 11/03* (2006.01)

(52) U.S. Cl.
CPC ...... B60C 11/1236 (2013.01); B60C 11/0304 (2013.01); B60C 11/0306 (2013.01);
(Continued)

(58) Field of Classification Search
CPC ....... B60C 2011/129; B60C 2011/0348; B60C 11/1263; B60C 2011/0351; B60C 2011/1295; B60C 11/12
(Continued)

(56) References Cited

U.S. PATENT DOCUMENTS 3,023,798 A * 3/1962 Moore ................ B60C 11/0318
152/209.3
6,571,844 B1 * 6/2003 Ochi ...................... B60C 11/11
152/209.18
(Continued)

FOREIGN PATENT DOCUMENTS

EP 1 070 606 A2 1/2001
EP 1 555 142 A2 7/2005
(Continued)

OTHER PUBLICATIONS

Machine Translation: JP-2009286276-A; Nagayasu, Masaaki; (Year: 2018).*
(Continued)

*Primary Examiner* — Kendra Ly
(74) *Attorney, Agent, or Firm* — Birch, Stewart, Kolasch & Birch, LLP

(57) ABSTRACT

A tire includes a tread portion being provided with a pair of circumferentially and continuously extending shoulder main grooves and at least one crown main groove between the shoulder main grooves to form a pair of middle portions each of which is between adjacent one crown main groove and one shoulder main groove. Each of the middle portions is provided with a circumferentially and continuously extending longitudinal sipe, a plurality of inner middle sipes extending axially outwardly from the crown main groove and terminating without reaching the longitudinal sipe and a plurality of outer middle sipe extending axially inwardly from the shoulder main groove and terminating without reaching the longitudinal sipe. The number of the outer middle sipes is greater than the number of the inner middle sipes.

17 Claims, 8 Drawing Sheets

(52) U.S. Cl.
CPC ...... B60C 11/1204 (2013.01); B60C 11/1218 (2013.01); B60C 11/1263 (2013.01); B60C 2011/039 (2013.01); B60C 2011/0341 (2013.01); B60C 2011/0348 (2013.01); B60C 2011/0386 (2013.01); B60C 2011/0388 (2013.01); B60C 2011/0395 (2013.01); B60C 2011/129 (2013.01); B60C 2011/1209 (2013.01); B60C 2011/1295 (2013.01)

(58) Field of Classification Search
USPC .................................................. 152/DIG. 3
See application file for complete search history.

(56) References Cited

U.S. PATENT DOCUMENTS

| | | | | |
|---|---|---|---|---|
| 2002/0033214 | A1* | 3/2002 | Carra | B60C 11/11 152/209.9 |
| 2003/0226629 | A1* | 12/2003 | Kimishima | B60C 11/0306 152/209.18 |

FOREIGN PATENT DOCUMENTS

| | | | | | |
|---|---|---|---|---|---|
| EP | 3 118 026 A1 | | 1/2017 | | |
| JP | 02200503 A | * | 8/1990 | ......... | B60C 11/1263 |
| JP | 06115317 A | * | 4/1994 | | |
| JP | 07172110 A | * | 7/1995 | | |
| JP | 09188110 A | * | 7/1997 | | |
| JP | 2001055013 A | * | 2/2001 | ............ | B60C 11/04 |
| JP | 2009286276 A | * | 12/2009 | | |
| JP | 2011162022 A | * | 8/2011 | | |
| JP | 2012228981 A | * | 11/2012 | | |
| JP | 2015-13603 A | | 1/2015 | | |

OTHER PUBLICATIONS

Machine Translation: JP-07172110-A; Akiyama, Ichiro; (Year: 2019).*
Machine Translation: JP-2001055013-A; Kanamaru, Shinya; (Year: 2019).*
Machine Translation: JP-2012228981-A; Hatano, Seishi; (Year: 2019).*
Machine Translation: JP-09188110-A; Kobayashi, Takashi; (Year: 2019).*
Machine Translation: JP-02200503-A; Yamashita, Nobuhiro; (Year: 2019).*
Machine Translation: JP-2011162022-A; Takahashi, Junichi; (Year: 2019).*
Machine Translation: JP-06115317-A; Hatada, Yuji; (Year: 2019).*
Extended European Search Report, dated Feb. 9, 2017, for European Application No. 16189091.8.

* cited by examiner

TIRE

BACKGROUND ART

Field of the Invention

The present invention relates to tires, and more particularly to a pneumatic tire capable of improving steering stability on dry road surfaces and driving performance on snow in a good balance.

Description of the Related Art

Japanese Unexamined Patent Application Publication No. 2015-13603 discloses a tire tread provided with circumferentially extending main grooves and sipes. Such a pneumatic tire may improve driving performance on snow (hereinafter referred to as "snow performance") by the circumferential groove edge components, and in particular suppresses side slip of vehicles.

Unfortunately, the main grooves and sipes tend to reduce rigidity of the tread and therefore steering stability on dry road surfaces may be lowered.

SUMMARY OF THE INVENTION

In view of the above problems in the conventional art, the present invention has an object to provide a tire capable of improving steering stability on dry road surfaces and snow performance in a good balance.

According to one aspect pf the invention, a tire includes a tread portion being provided with a pair of circumferentially and continuously extending shoulder main grooves and at least one crown main groove between the shoulder main grooves to form a pair of middle portions each of which is between one crown main groove and one shoulder main groove arranged adjacently. Each of the middle portions is provided with a circumferentially and continuously extending longitudinal sipe, a plurality of inner middle sipes extending axially outwardly from the crown main groove and terminating without reaching the longitudinal sipe and a plurality of outer middle sipe extending axially inwardly from the shoulder main groove and terminating without reaching the longitudinal sipe. The number of the outer middle sipes is greater than the number of the inner middle sipes.

In another aspect of the invention, the inner middle sipes and the outer middle sipes may have shallow bottom portions in which bottoms are raised.

In another aspect of the invention, maximum depths of the inner middle sipes and the outer middle sipes may be greater than a maximum depth of the longitudinal sipe.

In another aspect of the invention, the inner middle sipes may have axially outer ends which are apart from the longitudinal sipe at an axial distance of from 3.0 to 5.0 mm.

In another aspect of the invention, the outer middle sipes may have axially inner ends which are apart from the longitudinal sipe at an axial distance of from 3.0 to 5.0 mm.

In another aspect of the invention, the outer middle sipes may include a first outer middle sipe arranged substantially on one of extension lines in which the inner middle sipes are smoothly extended along its shape and a second outer middle sipe arranged on a location which is apart from the extension lines, and the first outer middle sipe and the second outer middle sipe may have a same axial length.

In another aspect of the invention, the first outer middle sipe and the second outer middle sipe may have a same angle with respect to an axial direction of the tire.

In another aspect of the invention, the first outer middle sipe and the second outer middle sipe may be arranged alternately in a circumferential direction of the tire.

In another aspect of the invention, the outer middle sipes may be arranged at a plurality kinds of circumferential pitches, and circumferentially adjacent pitches may be different from each other.

In another aspect of the invention, the at least one crown main groove may include a pair of crown main grooves to form a crown portion therebetween on a tire equator, and the crown portion may be provided with crown sipes that extend axially inwardly from each of the crown main grooves.

DESCRIPTION OF THE PREFERRED EMBODIMENTS

Figure 1:
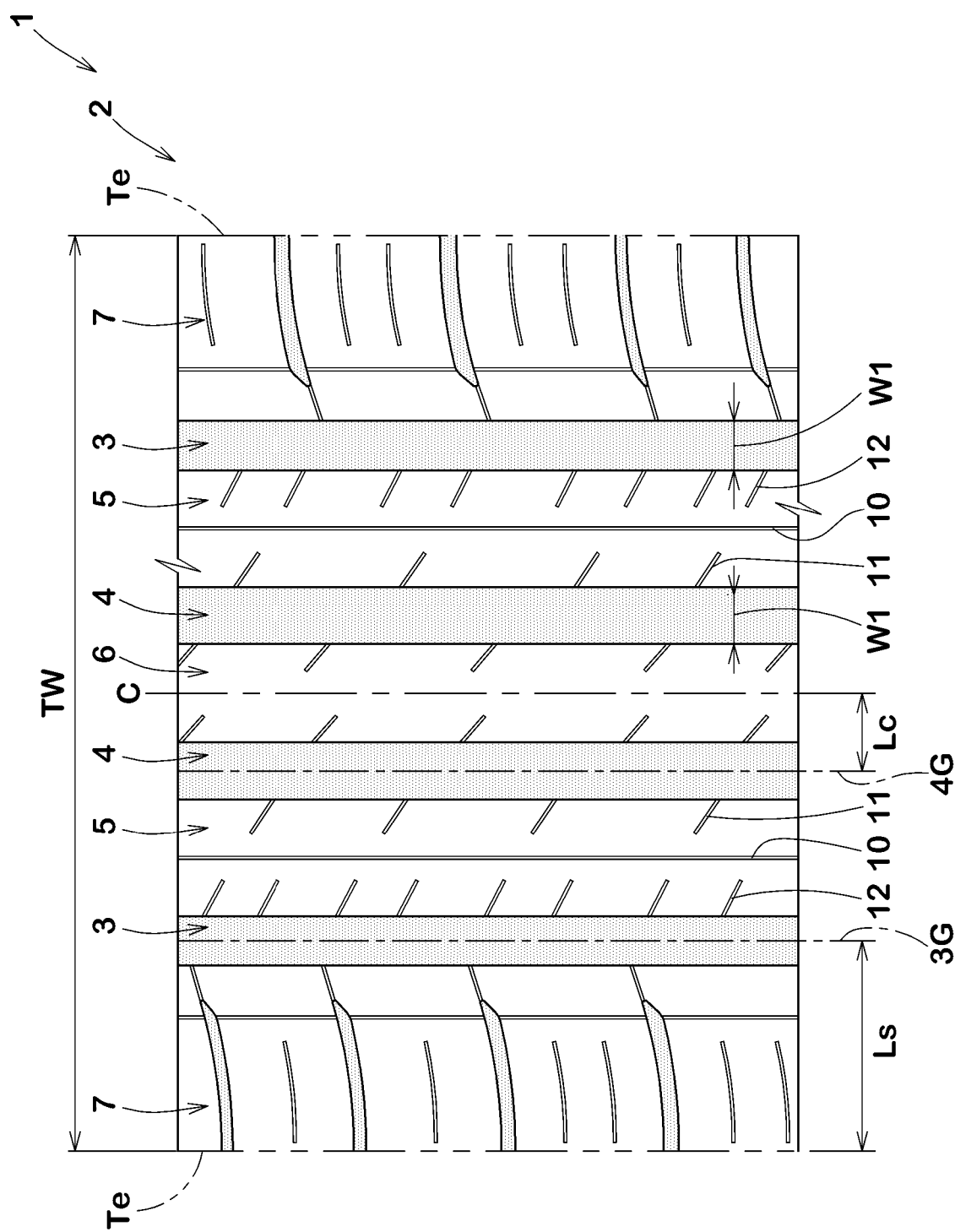
FIG. 1 is a development view of a tread portion of a pneumatic tire according to an embodiment of the present invention.

An embodiment of the present invention will be explained below with reference to the accompanying drawings. Note that like reference numerals refer to the like elements throughout.

FIG. 1 illustrates a development view of a tread portion 2 of a tire 1 according to an embodiment of the present invention. The tire 1 according to the invention can be used as pneumatic tires for passenger cars and heavy duty vehicles. Furthermore, the present invention can also be used as airless tires that can carry a load by its structural components without the support of gas inflation. In this embodiment, the tire 1 for example, is embodied as a pneumatic tire for summer conditions.

As illustrated in FIG. 1, the tread portion 2 is provided with a pair of circumferentially and continuously extending shoulder main grooves 3 and 3, and at least one crown main groove 4. Each of the shoulder main grooves 3 is disposed on a side of tread edge Te on each side of the tire equator C. The at least one crown main groove 4 includes a pair of crown main grooves 4 which are disposed between the shoulder main grooves 3 and 3 such that the tire equator C is located therebetween.

The shoulder main grooves 3 and the crown main grooves 4 extend straightly in the circumferential direction of the tire. These main grooves 3 and 4 may suppress unsteady traveling of a vehicle at the time of braking by increasing rigidity of land portions on both sides of the main grooves 3 and 4 and therefore it may be useful to improve steering stability. Furthermore, snow can be removed from the main grooves 3 and 4 easily without being clogged therein when the tire travels on snow, and thus snow performance of the tire can be improved. Note that the shoulder main grooves 3 and the crown main grooves 4 are not limited to the above embodiment, but can extend in a zigzag or wavy manner.

Preferably, widths W1 of the main grooves 3 and 4 are in a range of from 2% to 9% of the tread width TW in order to increase rigidity of the tread portion 2 to improve steering stability. Note that the widths W1 are not particularly limited to the above. Preferably, a depth of each of the main grooves 3 and 4 is in a range of from 6.5 to 8.5 mm.

Furthermore, each of the shoulder main grooves 3 is preferably disposed at a location such that an axial distance Ls between the tread edge Te and the shoulder groove centerline 3G is of from 20% to 30% of the tread width TW. Similarly, each of the crown main grooves 4 is preferably disposed at a location such that an axial distance Lc between the tire equator C and the crown groove centerline 4G is of from 3% to 15% of the tread width TW. This arrangement may ensure axial rigidity of the respective land portions separated by the main grooves 3 and 4 in a good balance.

In this embodiment, the tread portion 2 is separated into a pair of middle portions 5, a single crown portion 6 and a pair of shoulder portions 7 by the main grooves 3 and 4. Each of the middle portions 5 is defined between the adjacent one shoulder main groove 3 and one crown main groove 4. The crown portion 6 is defined between the pair of crown main grooves 4 and 4. Each of the shoulder portions 7 is defined between adjacent one shoulder main groove 3 and one tread edge Te.

As used herein, the tread width TW is defined as an axial distance between the tread edges Te and Te under a standard condition of the tire 1.

As used herein, the standard condition is such that the tire 1 is mounted on a standard wheel rim with a standard pressure, but is loaded with no tire load. In this application including specification and claims, various dimensions, positions and the like of the tire 1 refer to those under the standard condition of the tire unless otherwise noted.

As used herein, the tread edges Te refer to axially outermost edges of the ground contacting patch of the tread portion 2 which occurs under the standard condition with a standard tire load when the camber angle of the tire is set to zero.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger car tire, however, the standard pressure is uniformly defined as 180 kPa.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like. In case of passenger car tires, however, the standard tire load is uniformly defined as 88% of the maximum tire load.

Figure 2:
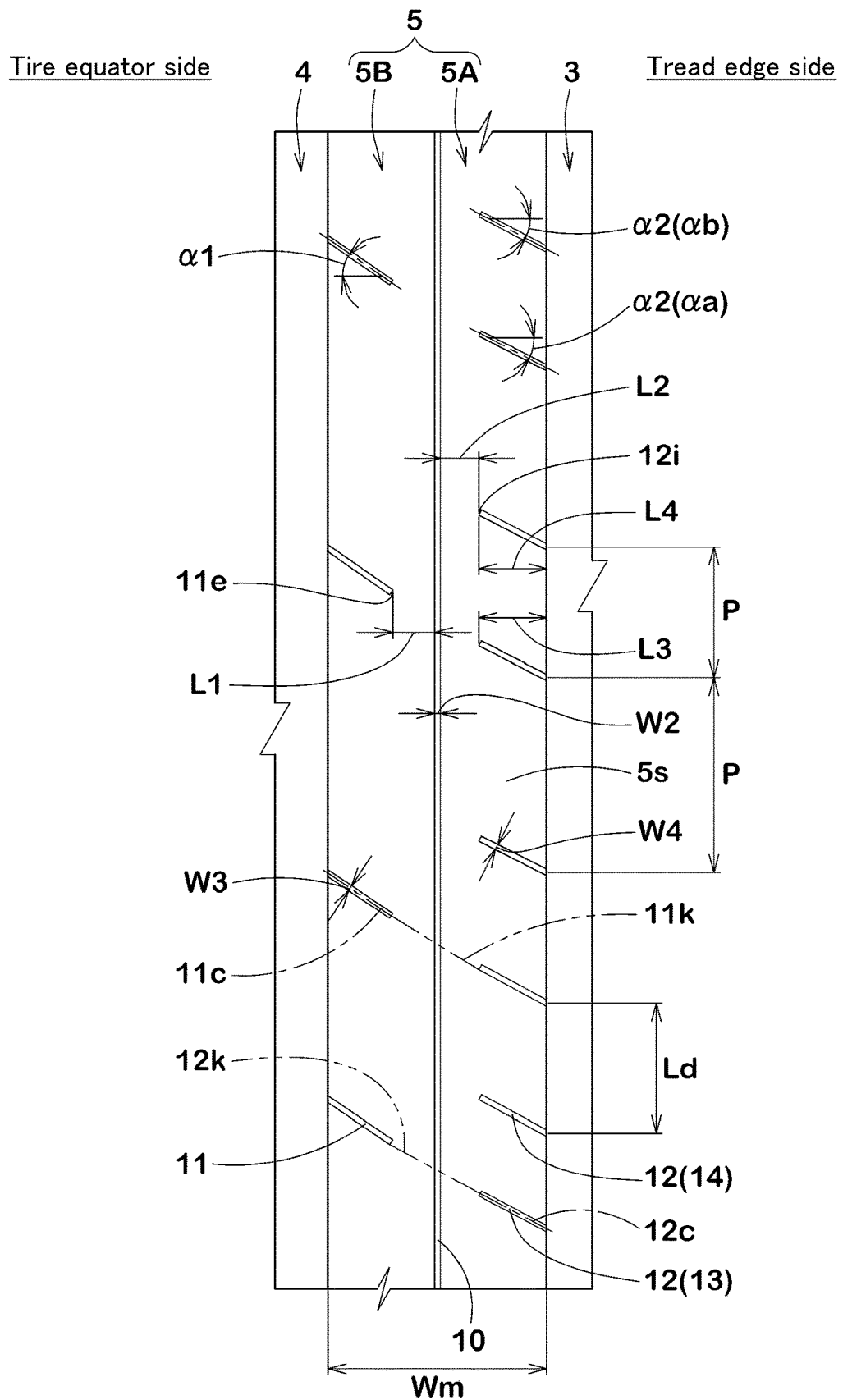
FIG. 2 is an enlarged view of a middle portion of FIG. 1.

FIG. 2 illustrates an enlarged view of one of the middle portions 5 of FIG. 1. As illustrated in FIG. 2, each of the middle portions 5 is provided with a longitudinal sipe 10, a plurality of inner middle sipes 11 and a plurality of outer middle sipes 12. In this embodiment, no other grooves nor sipes are provided on each of the middle portions 5.

The longitudinal sipe 10 extends continuously in the circumferential direction of the tire so as to divide the middle portion 5 into an axially outer portion 5A and an axially inner portion 5B. Since the longitudinal sipe 10 can offer a long circumferential edge component on the tread portion 2 to generate large lateral friction force particularly against compressed snow roads, side slip of a vehicle can be prevented. Thus, snow performance of the tire can be improved.

The longitudinal sipe 10 according to the embodiment extends in a straight manner along the circumferential direction of the tire. Such a longitudinal sipe 10 may ensure a high circumferential rigidity of the middle portion 5. Note that the longitudinal sipe 10 is not particularly limited to a straight manner.

Preferably, the longitudinal sipe 10 is located within an axially central region of the middle portion 5. Thus, the axially outer and inner portions 5A and 5B of the middle portion are balanced in the axial rigidity with each other, and therefore steering stability can be improved. In view of the above, the axially central region is preferably defined as a region having an axial width of from 40% to 60% of the axial width Wm of the middle portion 5.

Preferably, the longitudinal sipe 10 has a width W2 in a range of from 0.6 to 1.0 mm and a depth D1 (illustrated in FIG. 3) in a range of from 3.2 to 5.0 mm.

Each of the middle portions 5 is divided into the axially outer portion 5A between the longitudinal sipe 10 and the shoulder main groove 3 and the axially inner portion 5B between the longitudinal sipe 10 and the crown main groove 4.

In each of the middle portions 5, the inner middle sipes 11 extend axially outwardly from the crown main groove 4 and terminating within the axially inner portion 5B without reaching the longitudinal sipe 10. In each of the middle portions 5, the outer middle sipes 12 extend axially inwardly from the shoulder main groove 3 and terminating within the axially outer portion 5A without reaching the longitudinal sipe 10. Since the inner middle sipes 11 and the outer middle sipes 12 include axial edge components, steering stability of the tire can further be improved by offering large traction on snow. Furthermore, since the inner middle sipes 11 and the outer middle sipes 12 are not communicated with the longitudinal sipe 10, the middle portions 5 can maintain sufficient rigidity to improve steering stability.

The number of the outer middle sipes 12 is greater than the number of the inner middle sipes 11 in each of the middle portions 5. Thus, the axially outer portion 5A of the middle portion 5, which receives large load at the time of cornering, can generate large friction force, and therefore snow performance can be improved.

The outer middle sipes 12 include first outer middle sipes 13 each of which is arranged substantially on one of extension lines 11k in which the inner middle sipes 11 are smoothly extended along its shape and second outer middle sipes 14 each of which is arranged on a location which is apart from the extension lines 11k. In this embodiment, the first outer middle sipes 13 and the second outer middle sipes 14 are arranged alternately in the circumferential direction of the tire. Such a first outer middle sipe 13 can form an almost smoothly successive virtual sipe in cooperate with one of the inner middle sipe 11, and thus it may generate large friction force to further improve snow performance. In this embodiment, the number of the inner middle sipes 11 is half of the number of the outer middle sipes 12.

In one aspect of the embodiment where one first outer middle sipe 13 is arranged substantially on one of the extension lines 11k, the entire first outer middle sipe 13 may be arranged on one of the extension lines 11k. Alternatively, in another aspect of the embodiment, one of the first outer middle sipes 13 may intersect with one of the extension lines 11k. In yet another aspect of the embodiment, an extension line 12k in which the centerline 12c of one first outer middle sipe 13 is smoothly extended may intersect with one inner middle sipe 11.

Each of the inner middle sipes 11 and the outer middle sipes 12 is inclined at an angle with respect to the axial direction of the tire. This configuration of the middle sipes 11 and 12 may generate friction force in various directions against snow roads to improve snow performance since the middle sipes 11 and 12 have circumferential and axial edge components. Preferably, the angles α1 and α2 of the inner middle sipes 11 and the outer middle sipes 12 respectively are in a range of from 15 to 45 degrees in order to further improve the above effect.

In this embodiment, the inner middle sipes 11 and the outer middle sipes 12 extend in a straight manner. This configuration may be useful to generate large friction force against snow roads by maintaining rigidity of the respective middle portions 5. Alternatively, each of the middle sipes 11 and 12 may be formed in a curved or arc manner.

Preferably, the inner middle sipes 11 have axially outer ends 11e which are apart from the longitudinal sipe 10 at an axial distance L1 of from 3.0 to 5.0 mm in order to maintain sufficient edge length of the sipes while suppressing reduction in rigidity of the middle portions 5.

In the same point of view, the outer middle sipes 12 have axially inner ends 12i which are apart from the longitudinal sipe 10 at an axial distance L2 of from 3.0 to 5.0 mm.

Figure 3:
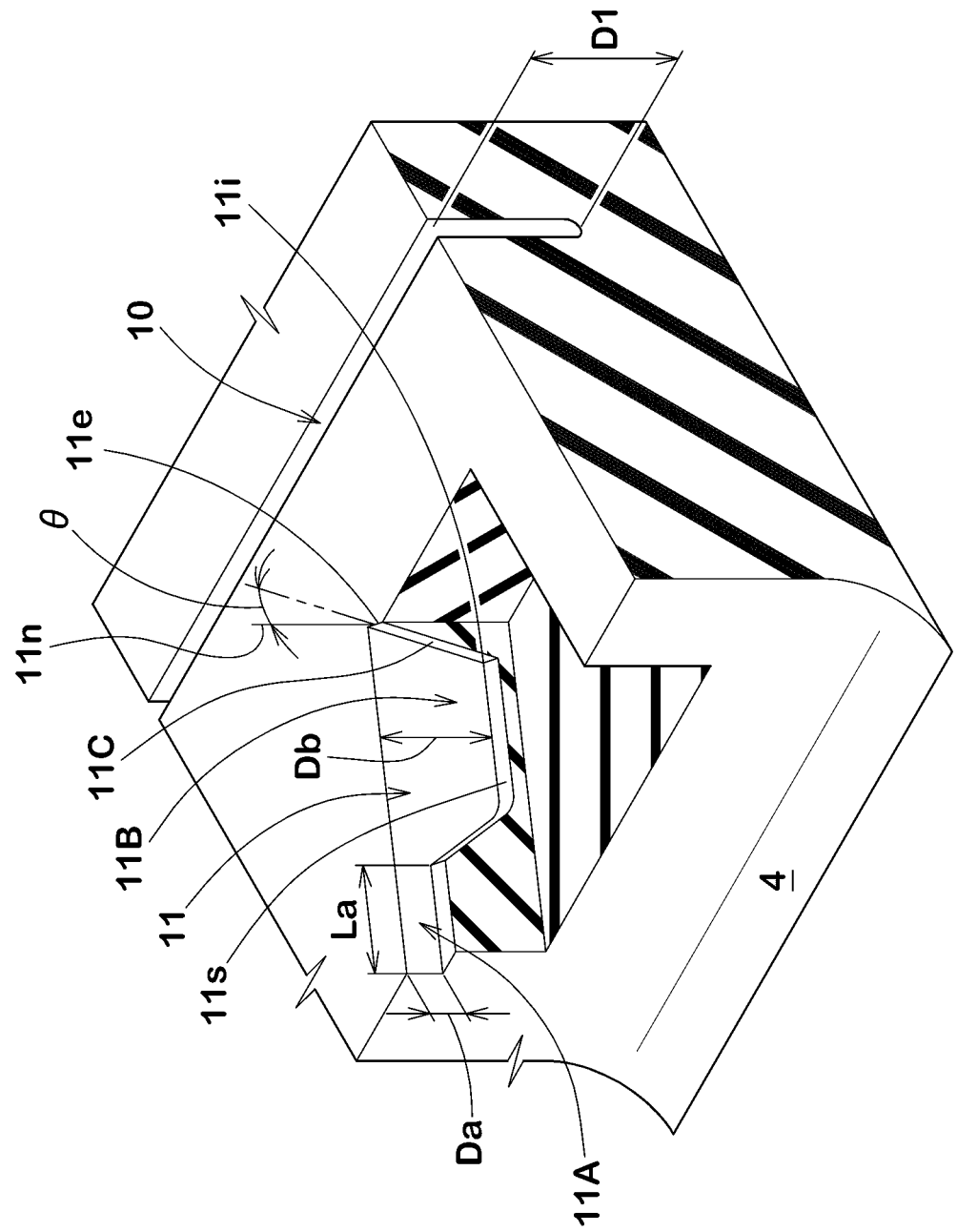
FIG. 3 is a partial perspective view of the middle portion of FIG. 1.

FIG. 3 illustrates a perspective view of one of the inner middle sipes 11. As illustrated in FIG. 3, each of the inner middle sipe 11 includes at least one shallow bottom portion and a deep bottom portion 11B. The at least one shallow bottom portion 11A is a portion that the bottom 11s of the inner middle sipe 11 is raised. The deep bottom portion 11B is a portion having the maximum depth.

In this embodiment, the at least one shallow bottom portion 11A is communicated with the crown main groove 4. The shallow bottom portion 11A may be useful to improve steering stability of the tire by ensuring rigidity of the middle portion 5.

In view of further improving the above effect, the depth Da of the shallow bottom portion 11A is preferably in a range of from 1.0 to 2.0 mm. Furthermore, the shallow bottom portion 11A preferably has a length La in a range of from 2.0 to 3.0 mm.

The inner middle sipes 11 further includes another shallow bottom portion 11C which extends from the axially outer end 11i of the deep bottom portion 11B to a ground contact surface of the middle portion 5. The shallow bottom portion 11C preferably varies in depth gradually so as to have an angle θ of from 25 to 40 degrees with respect to the tire normal line 11n that passes through the outer end 11e of the inner middle sipe 11. The shallow bottom part 11C can remove snow from the inner middle sipe 11 smoothly and suppresses reduction in rigidity of the middle portions 5.

In order to further emphasize the above effect, it is preferable that at least one of the outer middle sipes 12 also includes a shallow bottom portion in which the bottom is raised and a deep bottom portion having the maximum depth (both not illustrated). In the at least one of the outer middle sipes 12, the shallow bottom portion and the deep bottom portion preferably have the same configuration as the shallow bottom portion 11A and the deep bottom portion 11B of the inner middle sipes 11, respectively.

The maximum depths Db of the inner middle sipes 11 and the maximum depths (not illustrated) of the outer middle sipes 12 may be greater than the depth D1 of the longitudinal sipe 10. Preferably, the maximum depths Db of the inner middle sipes 11 and the maximum depths of the outer middle sipes 12 are in a range of from 5.0 to 6.0 mm.

As illustrated in FIG. 2, the respective widths W3 and W4 of the inner middle sipes 11 and the outer middle sipes 12 are preferably in a range of from 0.6 to 1.0 mm in order to ensure sufficient rigidity of the middle portions 5 so as to generate large friction force against the ground. More preferably, the respective widths W3 and W4 of the inner middle sipes 11 and the outer middle sipes 12 are the same as the width W2 of the longitudinal sipe 10 in order to further improve the above effect. Preferably, axial lengths L3 of the first outer middle sipes 13 may be equal or substantially equal to the length L4 of the second outer middle sipes 14 to ensure sufficient rigidity of the axially outer portion 5A of the middle portion 5.

Preferably, angles αa of the first outer middle sipes 13 with respect to the axial direction of the tire are equal to or substantially equal to angles αb of the second outer middle sipes 14 with respect to the axial direction of the tire. That is, the first outer middle sipes 13 are preferably arranged in substantially parallel with the second outer middle sipes 14. This configuration may improve steering stability of the tire since rigidity of each of block-like portions 5s between one first outer middle sipe 13 and one second outer middle sipe 14 is uniformized over the axial direction of the tire on the axially outer portion 5A of the middle portion 5.

The outer middle sipes 12 are arranged in the circumferential direction of the tire at a plurality kinds of circumferential pitches P, wherein circumferentially adjacent pitches are preferably different from each other. At a region with a smaller pitch, since the middle portion 5 tends to elastically deform locally due to its low circumferential rigidity, large traction can be obtained. On the other hand, at a region with a larger pitch, the middle portion 5 tends to have high circumferential rigidity and therefore steering stability as well as snow performance of the tire can be improved in a good balance.

Although it is not particularly limited, circumferential distances Ld between adjacent first outer middle sipe 13 and second outer middle sipe 14 are preferably in a range of from 40% to 120% of the axial width Wm of the middle portion 5.

Figure 4:
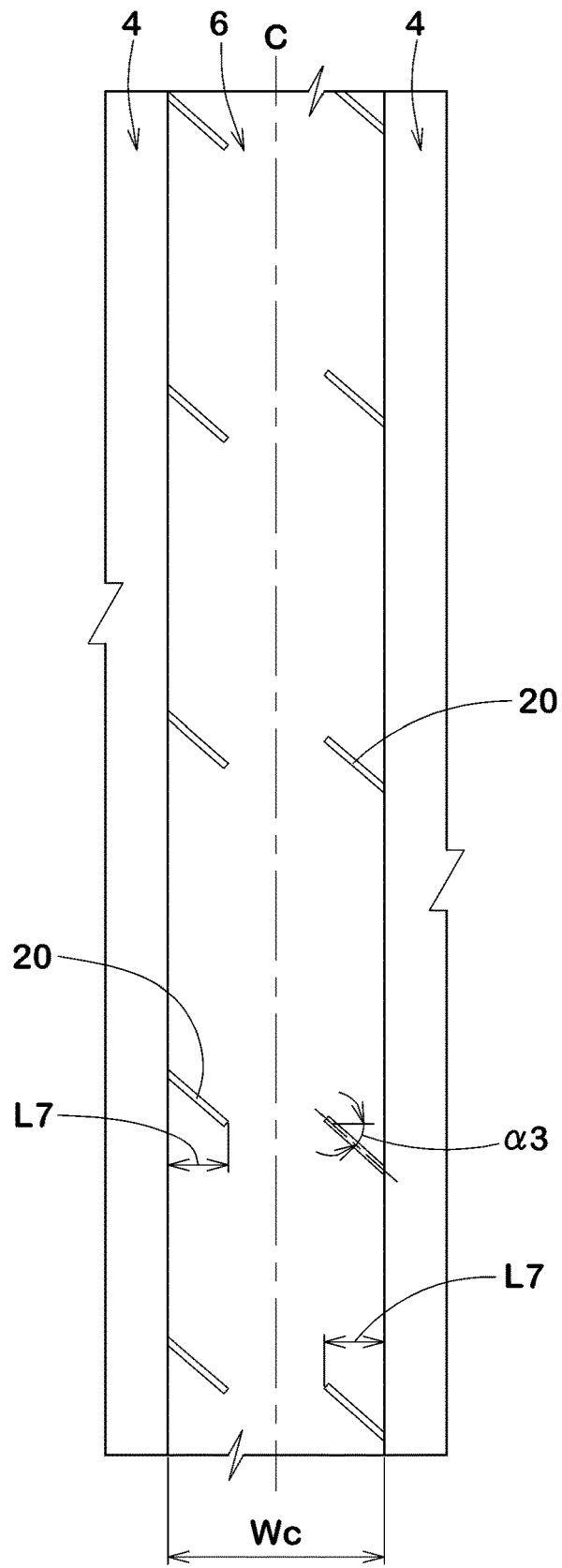
FIG. 4 is an enlarged view of a crown portion of FIG. 1.

As illustrated in FIG. 4, the crown portion 6 is provided with a plurality of crown sipes 20 that extend from a respective one of the crown main grooves 4 toward the tire equator C. Such a crown sipe 20 may help to increase snow traction using its axial edge component.

The crown sipes 20 terminate within the crown portion 6 without reaching the tire equator C in order to ensure sufficient rigidity of the crown portion 6, which is apt to receive large ground contact pressure, to improve steering stability. Preferably, axial lengths L7 of the crown sipes 20 are in a range o from 20% to 35% of the axial width We of the crown portion 6.

The crown portion 6 is not provided with any sipes nor grooves except the crown sipes 20 so that steering stability can be improve.

Preferably, angles α3 of the crown sipes 20 are set in a range of from 15 to 45 degrees with respect to the axial direction of the tire in order to increase traction using its axial edge components.

Figure 5:
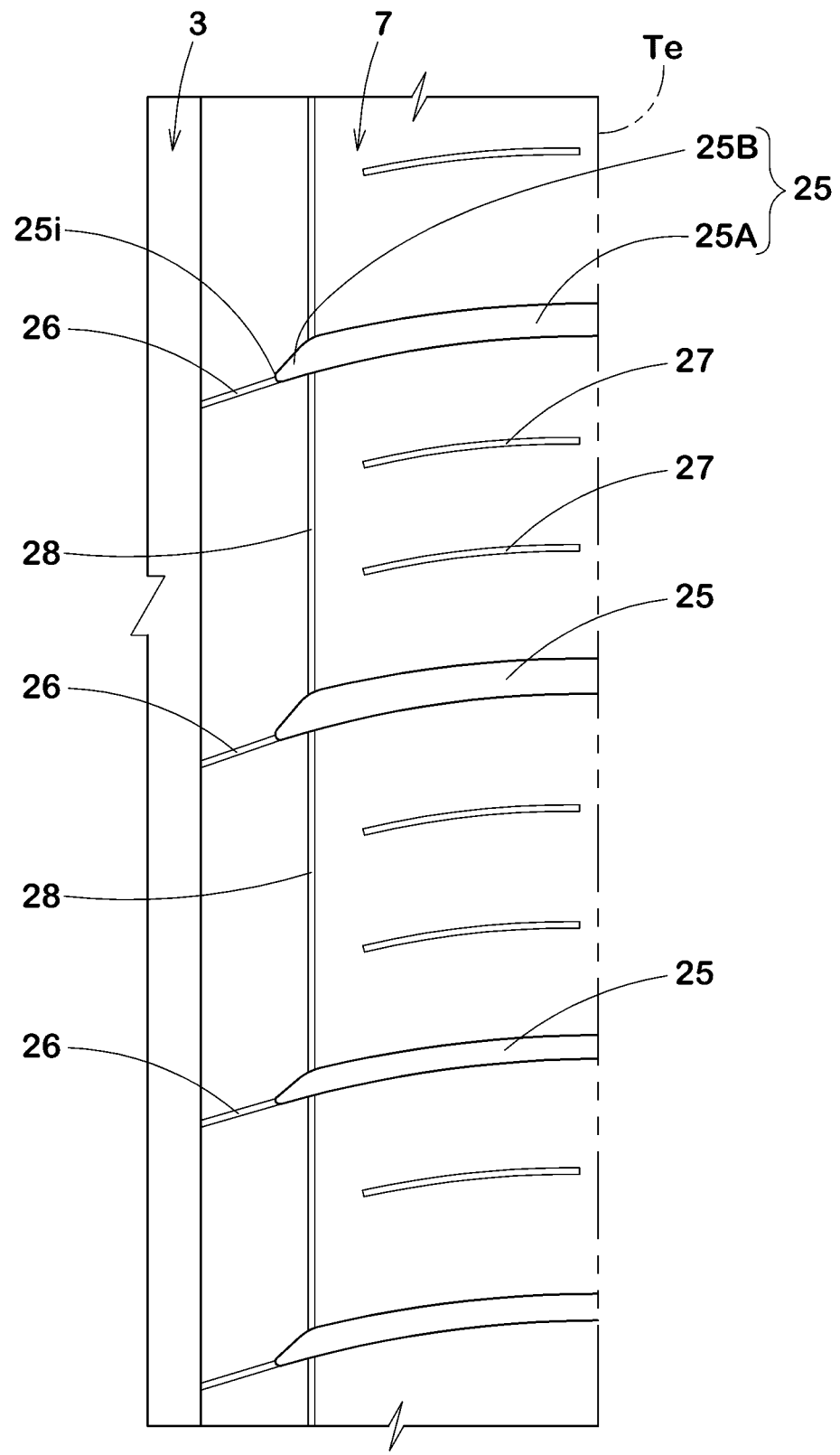
FIG. 5 is an enlarged view of a shoulder portion of FIG. 1.

As illustrated in FIG. 5, each of the shoulder portions 7 is provided with shoulder lug grooves 25, first shoulder lateral sipes 26, second shoulder lateral sipes 27 and shoulder longitudinal sipes 28.

The shoulder lug grooves 25 extend axially inwardly from the tread edge Te and terminate within the shoulder portion 7 without reaching the shoulder main groove 3. In this embodiment, each of the shoulder lug grooves 25 include a constant width portion 25A and a gradually decreasing width portion 25B.

The first shoulder lateral sipes 26 extend to connect the axially inner ends 25i of the shoulder lug grooves 25 to the shoulder main grooves 3. The first shoulder lateral sipes 26 may increase friction force against the ground in cooperation with the shoulder lug grooves 25 while suppressing reduction in rigidity of the shoulder portion 7.

In this embodiment, a plurality of (two in the embodiment) second shoulder lateral sipes 27 are arranged between circumferentially adjacent shoulder lug grooves 25 and 25. The second shoulder lateral sipes 27 are configured to have both ends terminating within the shoulder portion 7 such that the both ends are not communicated with any other sipes nor grooves. Such a second shoulder lateral sipe 27 may be useful to increase edge components while suppressing reduction in rigidity of the shoulder portion 7. Thus, snow performance and steering stability of the tire can further be improved in a good balance.

In this embodiment, each of the shoulder longitudinal sipes 28 connects circumferentially adjacent shoulder lug grooves 25 and 25. Preferably, the both ends of each of the shoulder longitudinal sipes 28 are connected to a location between the constant width portion 25A and the decreasing width portion 25B. The shoulder longitudinal sipes 28 may further improve snow performance of the tire.

While the particularly preferable embodiments in accordance with the present invention have been described in detail, the present invention is not limited to the illustrated embodiments, but can be modified and carried out in various aspects.

Example

Test tires 215/55R16 with a basic tread pattern illustrated in FIG. 1 were manufactured based on the detail shown in Table 1, and then steering stability and snow performance of each tire was tested. Common specification and test method are as follows:

Rim: 16×7JJ,
Tire internal pressure: 230 kPa,
Test vehicle: FF with 2,000 cc displacement,
Test tire installed location: all wheels,
Axial distance L1 being set equal to axial distance L2,
Maximum depths of inner middle sipes being equal to maximum depths of outer middle sipes, and
Number of outer middle sipes in Ref. 2 being equal to number of outer middle sipes in Ex. 1.

Steering Stability Test:
A test driver drove the test vehicle on a test course having a dry road surface to evaluate steering stability based on steering response, rigidity feeling, braking performance and grip by his sense. The test results are shown in Table 1 with a score based on Ref. 1 being 100. The larger the value, the better the performance is.

Snow Performance Test:
A test driver drove the test vehicle on a snowy road with compressed snow surface to evaluate snow performance by his sense. The test results are shown in Table 1 with a score based on Ref. 1 being 100. The larger the value, the better the performance is.

Test results are provided in Table 1.

[Table 1]

From the test results, it is confirmed that the example tires improve steering stability and snow performance as compared with the comparative examples.

TABLE 1

Figure 6:
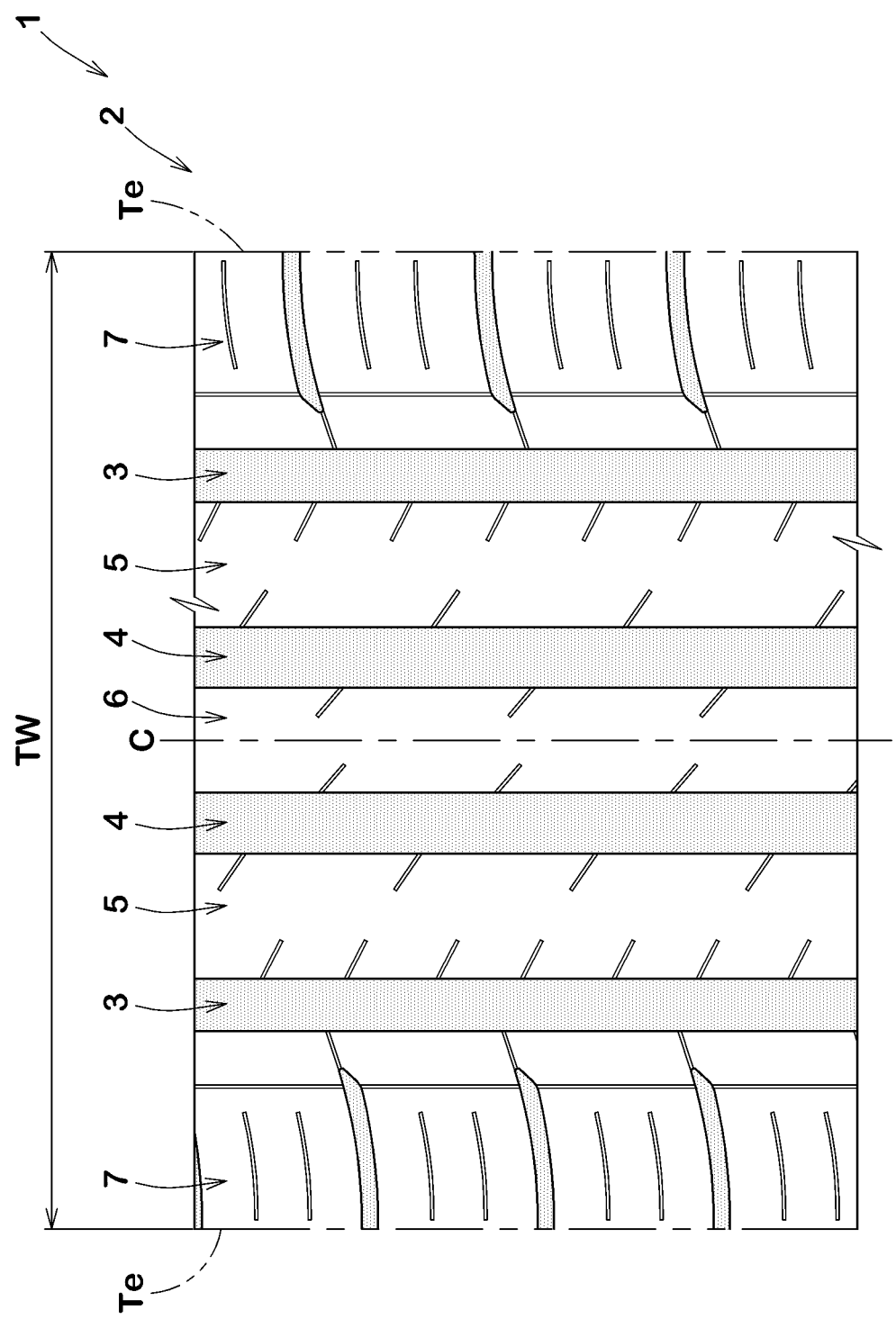
FIG. 6 is a development view of the tread portion according to another embodiment.
Figure 7:
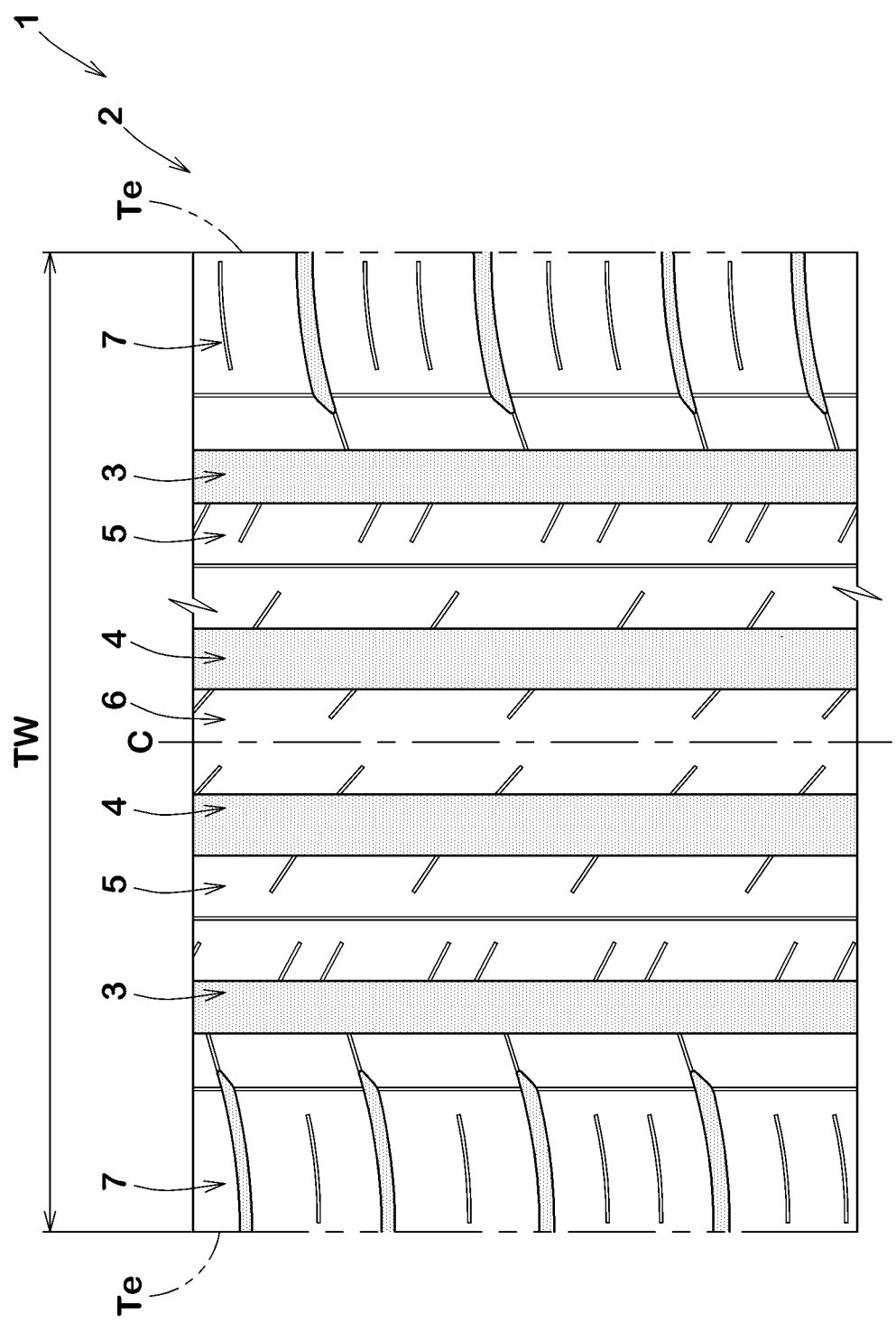
FIG. 7 is a development view of the tread portion according to yet another embodiment.
Figure 8:
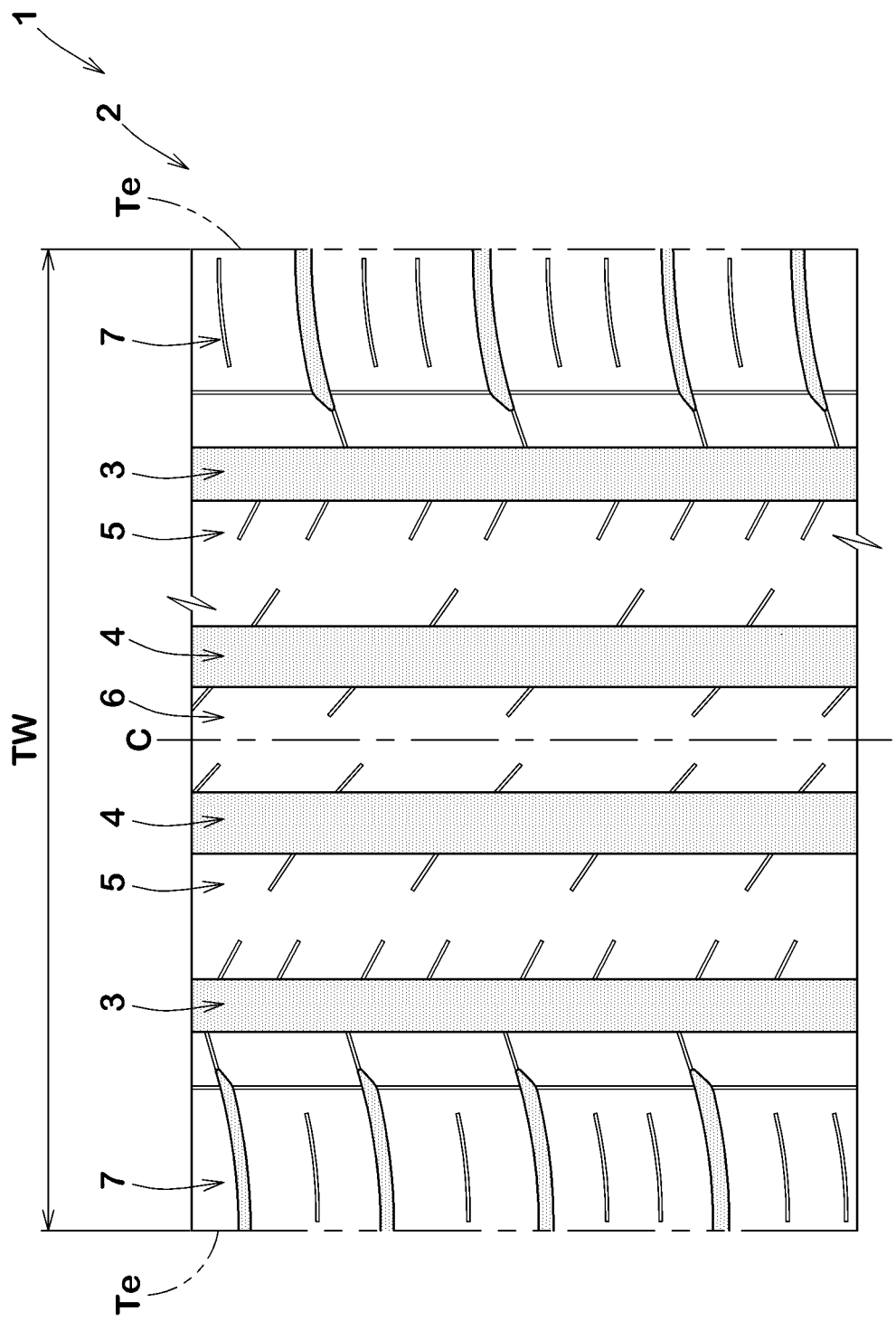
FIG. 8 is a development view of a tread portion according to a comparative example.

| | Ref. 1 | Ex. 1 | Ex. 2 | Ex. 3 | Ex. 4 | Ex. 5 | Ex. 6 | Ex. 7 | Ex. 8 | Ex. 9 | Ref. 2 | Ref. 3 |
|---|---|---|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 6 | FIG. 7 | FIG. 8 | FIG. 1 |
| Number of outer middle sipes/number of inner middle sipes | 2 | 2 | 2 | 2 | 2 | 2 | 2 | 2 | 2 | 2 | 2 | 1 |
| Axial distance L1 (mm) | 0 | 4.0 | 2.0 | 3.0 | 5.0 | 6.0 | 4.0 | 4.0 | 4.0 | 4.0 | 4.0 | 4.0 |
| Longitudinal sipe depth D1 (mm) | 3.7 | 3.7 | 3.7 | 3.7 | 3.7 | 3.7 | 3.7 | 5.2 | 3.7 | 3.7 | — | 3.7 |
| Maximum depths Db of inner middle sipes (mm) | 5.2 | 5.2 | 5.2 | 5.2 | 5.2 | 5.2 | 3.7 | 5.2 | 5.2 | 5.2 | 5.2 | 5.2 |
| Steering stability [score] | 100 | 110 | 105 | 108 | 111 | 112 | 107 | 110 | 108 | 108 | 115 | 100 |
| Snow performance [score] | 100 | 110 | 112 | 111 | 108 | 105 | 111 | 108 | 109 | 108 | 90 | 105 |

What is claimed is:

1. A tire comprising:
a tread portion being provided with a pair of circumferentially and continuously extending shoulder main grooves and at least one crown main groove between the shoulder main grooves to form a pair of middle portions each of which is between one crown main groove and one shoulder main groove arranged adjacently, wherein each middle portion is not provided with any lateral grooves that traverse the middle portion completely so as to form a circumferentially and continuously extending land portion; and
each of the middle portions being provided with a circumferentially and continuously extending longitudinal sipe, a plurality of inner middle sipes extending axially outwardly from the crown main groove and terminating without reaching the longitudinal sipe and a plurality of outer middle sipes extending axially inwardly from the shoulder main groove and terminating without reaching the longitudinal sipe, wherein
the number of the outer middle sipes is greater than the number of the inner middle sipes,
each of the inner middle sipes has at least one shallow bottom portion in which a bottom thereof is raised,
the at least one shallow bottom portion is communicated with the crown main groove directly, the plurality of outer middle sipes are arranged at a plurality of different circumferential pitches and circumferentially adjacent pitches are different from each other,
the longitudinal sipe, the inner middle sipes, and the outer middle sipes have widths in a range of from 0.6 to 1.0 mm, and
the pair of middle portions is not provided with any lateral grooves that have groove widths greater than the widths of the longitudinal sipe, the inner middle sipes, and the outer middle sipes.

2. The tire according to claim 1, wherein the inner middle sipes and the outer middle sipes have shallow bottom portions in which bottoms are raised.

3. The tire according to claim 2, wherein
the shallow bottom portions of the inner middle sipes and the shallow bottom portions of the outer middle sipes have depths in a range of 1.0 to 2.0 mm and lengths in a range of 2.0 to 3.0 mm.

4. The tire according to claim 1, wherein maximum depths of the inner middle sipes and the outer middle sipes are greater than a maximum depth of the longitudinal sipe.

5. The tire according to claim 1, wherein the inner middle sipes have axially outer ends which are apart from the longitudinal sipe at an axial distance of from 3.0 to 5.0 mm.

6. The tire according to claim 1, wherein the outer middle sipes have axially inner ends which are apart from the longitudinal sipe at an axial distance of from 3.0 to 5.0 mm.

7. The tire according to claim 1, wherein
the outer middle sipes comprise a first outer middle sipe arranged substantially on one of extension lines in which the inner middle sipes are smoothly extended along its shape and a second outer middle sipe arranged on a location which is apart from the extension lines, and
the first outer middle sipe and the second outer middle sipe have a same axial length.

8. The tire according to claim 7, wherein the first outer middle sipe and the second outer middle sipe have a same angle with respect to an axial direction of the tire.

9. The tire according to claim 7, wherein the first outer middle sipe and the second outer middle sipe are arranged alternately in a circumferential direction of the tire.

10. The tire according to claim 1, wherein
the at least one crown main groove comprises a pair of crown main grooves to form a crown portion therebetween on a tire equator, and
the crown portion is provided with crown sipes that extend axially inwardly from each of the crown main grooves.

11. The tire according to claim 10, wherein the crown portion is not provided with any lateral grooves that traverse the crown portion completely so as to form a circumferentially and continuously extending land portion.

12. The tire according to claim 1, wherein the longitudinal sipe is not in communication with any other sipes or grooves.

13. The tire according to claim 1, wherein the number of the outer middle sipes is double the number of the inner middle sipes.

14. The tire according to claim 1, wherein the inner middle sipes and the outer middle sipes are inclined in a same direction with respect to a tire axial direction, and the inner middle sipes and the outer middle sipes extend in a straight manner.

15. A tire comprising:
a tread portion being provided with a pair of circumferentially and continuously extending shoulder main grooves and a pair of crown main grooves between the shoulder main grooves to form a crown portion between the pair of crown main grooves on a tire equator and a pair of middle portions each of which is between one crown main groove and one shoulder main groove arranged adjacently in a tire axial direction; wherein the crown portion is provided with crown sipes that extend axially inwardly from each of the pair of crown main grooves, and
each middle portion being provided with a circumferentially and continuously extending longitudinal sipe, inner middle sipes extending axially outwardly from the crown main groove and terminating without reaching the longitudinal sipe, and outer middle sipes extending axially inwardly from the shoulder main groove and terminating without reaching the longitudinal sipe, wherein
the number of the outer middle sipes is greater than the number of the inner middle sipes,
the inner middle sipes have axially outer ends which are apart from the longitudinal sipe at an axial distance of from 3.0 to 5.0 mm,
the outer middle sipes have axially inner ends which are apart from the longitudinal sipe at an axial distance of from 3.0 to 5.0 mm,
the longitudinal sipe is not in communication with any other sipes or grooves,
the crown sipes, the inner middle sipes and the outer middle sipes are inclined in a same direction with one another with respect to the tire axial direction,
the inner middle sipes and the outer middle sipes extend in a straight manner, and
the crown sipes are arranged such that the respective crown sipes do not overlap the respective inner middle sipes in a tire circumferential direction.

16. A tire comprising:
a tread portion being provided with a pair of circumferentially and continuously extending shoulder main grooves and at least one crown main groove between the shoulder main grooves to form a pair of middle portions each of which is between one crown main groove and one shoulder main groove arranged adjacently, wherein each middle portion is not provided with any lateral grooves that traverse the middle portion completely so as to form a circumferentially and continuously extending land portion; and
each middle portion being provided with a circumferentially and continuously extending longitudinal sipe, inner middle sipes extending axially outwardly from the crown main groove and terminating without reaching the longitudinal sipe, and outer middle sipes extending axially inwardly from the shoulder main groove and terminating without reaching the longitudinal sipe, wherein
the number of the outer middle sipes is greater than the number of the inner middle sipes,
each inner middle sipe comprises a deep bottom portion and a shallow bottom portion extending axially outwardly from an axially outer end of the deep portion to a ground contact surface of the middle portion,
the shallow portion varies in depth gradually so as to have an angle of from 25 to 40 degrees with respect to a tire normal line that passes through an axially outer end of the inner middle sipe, the plurality of outer middle sipes are arranged at a plurality of different circumferential pitches and circumferentially adjacent pitches are different from each other, the longitudinal sipe, the inner middle sipes, and the outer middle sipes have widths in a range of from 0.6 to 1.0 mm, and the pair of middle portions is not provided with any lateral grooves that have groove widths greater than the widths of the longitudinal sipe, the inner middle sipes, and the outer middle sipes.

17. A tire comprising:

a tread portion being provided with a pair of circumferentially and continuously extending shoulder main grooves and at least one crown main groove between the shoulder main grooves to form a pair of middle portions each of which is between one crown main groove and one shoulder main groove arranged adjacently, wherein each middle portion is not provided with any lateral grooves that traverse the middle portion completely so as to form a circumferentially and continuously extending land portion; and each middle portion being provided with a circumferentially and continuously extending longitudinal sipe, inner middle sipes extending axially outwardly from the crown main groove and terminating without reaching the longitudinal sipe, and outer middle sipes extending axially inwardly from the shoulder main groove and terminating without reaching the longitudinal sipe, wherein the number of the outer middle sipes is greater than the number of the inner middle sipes, maximum depths of the inner middle sipes and the outer middle sipes are greater than a maximum depth of the longitudinal sipe, the maximum depths of the inner middle sipes and the outer middle sipes are in a range of from 5.0 to 6.0 mm, depths of the pair of shoulder main grooves and the at least one crown main groove are in a range of from 6.5 to 8.5 mm, the plurality of outer middle sipes are arranged at a plurality of different circumferential pitches and circumferentially adjacent pitches are different from each other, the longitudinal sipe, the inner middle sipes, and the outer middle sipes have widths in a range of from 0.6 to 1.0 mm, and the pair of middle portions is not provided with any lateral grooves that have groove widths greater than the widths of the longitudinal sipe, the inner middle sipes, and the outer middle sipes.

\* \* \* \* \*